United States Patent
Narayanan et al.

(10) Patent No.: US 9,348,409 B2
(45) Date of Patent: *May 24, 2016

(54) SYSTEM, METHOD AND APPARATUS FOR CONTROLLING MULTIPLE APPLICATIONS AND SERVICES ON A DIGITAL ELECTRONIC DEVICE

(71) Applicant: Ecrio, Inc., Cupertino, CA (US)

(72) Inventors: Krishnakumar Narayanan, Pleasanton, CA (US); Venkata T. Gobburu, San Jose, CA (US); Srinivasa Upadhya, San Francisco, CA (US); John Michael Grubbs, Mansfield, TX (US)

(73) Assignee: ECRIO, INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,554

(22) Filed: Nov. 25, 2013

(65) Prior Publication Data

US 2014/0082640 A1  Mar. 20, 2014

Related U.S. Application Data

(63) Continuation of application No. 12/322,843, filed on Feb. 7, 2009, now Pat. No. 8,613,002.

(60) Provisional application No. 61/065,238, filed on Feb. 8, 2008.

(51) Int. Cl.
 *G06F 3/00* (2006.01)
 *G06F 9/54* (2006.01)
 *H04L 29/08* (2006.01)

(52) U.S. Cl.
 CPC ......... *G06F 3/00* (2013.01); *G06F 9/542* (2013.01); *H04L 67/16* (2013.01); *G06F 2209/543* (2013.01)

(58) Field of Classification Search
 None
 See application file for complete search history.

(56) References Cited

U.S. PATENT DOCUMENTS 6,685,093 B2  2/2004  Challa et al.
6,877,665 B2  4/2005  Challa et al.

(Continued)

FOREIGN PATENT DOCUMENTS

EP    1102498 B1    2/2004
JP    2003-108370   4/2003

(Continued)

OTHER PUBLICATIONS

Ecrio, Inc. Response to Rule 161 Communication, European Patent Application No. 09 709 147.4, Oct. 26, 2010. 21 Pages.

(Continued)

*Primary Examiner* — Andy Ho
*Assistant Examiner* — Carina Yun
(74) *Attorney, Agent, or Firm* — David H. Carroll

(57) ABSTRACT

A services and application controller ("SAC") is provided for digital electronic devices. The SAC includes four interfaces which respectively interact with four different environments, namely an application interface that interacts with application environments and applications, an extension interface that interacts with engines and enablers, a platform interface that interacts with device platform environments, and a service and network interface that interacts with services and service infrastructures and with networks. The SAC provides a set of core functions and abstracts the environments from each other, which enable interactions between these environments without requiring that the environments be aware of specific aspects of the other environments for the interactions.

3 Claims, 6 Drawing Sheets

(56) References Cited

U.S. PATENT DOCUMENTS

| | | | |
|---|---|---|---|
| 7,028,906 | B2 | 4/2006 | Challa et al. |
| 7,257,822 | B1 | 8/2007 | Sambhus et al. |
| 7,395,961 | B2 | 7/2008 | Challa et al. |
| 8,260,966 | B2 | 9/2012 | Shatsky et al. |
| 8,613,002 | B2 | 12/2013 | Narayanan et al. |
| 8,639,253 | B2 | 1/2014 | Narayanan et al. |
| 9,152,478 | B2 | 10/2015 | Narayanan et al. |
| 2002/0087741 | A1 | 7/2002 | Ing et al. |
| 2003/0061404 | A1 | 3/2003 | Atwal et al. |
| 2003/0105887 | A1 | 6/2003 | Cox et al. |
| 2003/0177185 | A1 | 9/2003 | Ryu et al. |
| 2004/0054640 | A1 | 3/2004 | Reichel et al. |
| 2005/0128957 | A1 | 6/2005 | Yuki |
| 2005/0172282 | A1 | 8/2005 | Shenfield et al. |
| 2005/0251584 | A1 | 11/2005 | Monga et al. |
| 2006/0116208 | A1 | 6/2006 | Chen et al. |
| 2006/0143622 | A1 | 6/2006 | Prabandham et al. |
| 2006/0150200 | A1 | 7/2006 | Cohen et al. |
| 2006/0239251 | A1 | 10/2006 | Bennett et al. |
| 2007/0173283 | A1 | 7/2007 | Livet et al. |
| 2008/0035734 | A1 | 2/2008 | Challa et al. |
| 2008/0141285 | A1 | 6/2008 | Lee et al. |
| 2008/0235778 | A1 | 9/2008 | Fratti et al. |
| 2009/0141654 | A1 | 6/2009 | Voutilainen et al. |
| 2009/0222842 | A1 | 9/2009 | Narayanan et al. |
| 2010/0257539 | A1 | 10/2010 | Narayanan et al. |
| 2012/0231787 | A1 | 9/2012 | Conner et al. |
| 2012/0281621 | A1 | 11/2012 | Lotfallah et al. |
| 2012/0307721 | A1 | 12/2012 | Jong et al. |
| 2012/0309294 | A1 | 12/2012 | Jong et al. |
| 2013/0028175 | A1 | 1/2013 | Jong et al. |
| 2013/0064106 | A1 | 3/2013 | Sylvain |
| 2013/0337864 | A1 | 12/2013 | Narayanan et al. |
| 2014/0109108 | A1 | 4/2014 | Narayanan et al. |
| 2014/0348044 | A1 | 11/2014 | Narayanan et al. |

FOREIGN PATENT DOCUMENTS

| | | |
|---|---|---|
| JP | 2003-345751 | 12/2003 |
| JP | 2008-501173 | 1/2008 |
| WO | 03007577 A1 | 1/2003 |
| WO | 03069472 A2 | 8/2003 |
| WO | 2005116821 A1 | 12/2005 |
| WO | 2007014776 A1 | 2/2007 |
| WO | 2007139288 A1 | 12/2007 |
| WO | 2009099637 A2 | 8/2009 |
| WO | 2013192243 A1 | 12/2013 |
| WO | 2014190094 A1 | 11/2014 |

OTHER PUBLICATIONS

Handley, M. et al. SIP: Session Initiation Protocol, Mar. 1999. 143 Pages.
International Searching Authority/EPO. International Search Report, International Patent Application No. PCT/US2009/000755, Jul. 28, 2009. 5 Pages.
International Searching Authority/EPO. Written Opinion of the International Searching Authority, International Patent Application No. PCT/US2009/000755, Jul. 28, 2009. 8 Pages.
International Searching Authority / FIPS. International Search Report: International Patent Application No. PCT/US2013/046437, Oct. 2, 2013. 2 Pages.
International Searching Authority / FIPS. Notification of Transmittal of the International Search Report and the Written Opinion of the International Searching Authority, or the Declaration: International Patent Application No. PCT/US2013/046437, Oct. 2, 2013, 1 Page.
International Searching Authority / FIPS. Written Opinion of the International Searching Authority: International Patent Application No. PCT/US2013/046437, Oct. 2, 2013. 4 Pages.
Japanese Patent Office. Office Action: Japanese Patent Application No. 2010-545879, Jul. 18, 2013. 13 pages.
Narayanan, Krishnakumar et al. Reply to Office Action: U.S. Appl. No. 12/322,843, Jul. 10, 2012. 23 Pages.
Narayanan, Krishnakumar et al. Request for Continued Examination: U.S. Appl. No. 12/322,843, Feb. 19, 2013. 22 Pages.
Narayanan, Krishnakumar et al. Supplemental Amendment and Statement of Substance of Interview: U.S. Appl. No. 12/322,843, Sep. 18, 2013. 26 Pages.
Narayanan, Krishnakumar et al. Reply to Office Action: U.S. Appl. No. 12/751,881, Apr. 15, 2013. 20 Pages.
Narayanan, Krishnakumar et al. Real-Time Communications Client Architecture: U.S. Appl. No. 13/527,571, Jun. 19, 2012. 47 Pages.
Narayanan, Krishnakumar et al. System, Method and Apparatus for Managing Multiple Applications on a Client Communications Device: U.S. Appl. No. 61/065,238, Feb. 8, 2008. 253 Pages.
Nokia Solutions and Networks. Rich Communication Suite Initiative, Feb. 7, 2008 [online] [retrieved on Oct. 23, 2013]. 4 Pages. Retrieved from the Internet: <URL:http://nsn.com/news-events/press-releases/rich-communication-suite-initiative>.
3rd Generation Partnership Project 2 "3GPP2". Short Message Service over IMS, 3GPP2 X.S0048-0, Version v1.0, Nov. 2007 [online] [retrieved on Oct. 23, 2013]. 54 Pages. Retrieved from the Internet: <URL:http://www.3gpp2.org/public_html/specs/X.S0048-0_v1.0-071111.pdf.X.S0048-0>.
Ecrio, Inc. Advanced Communications and Commerce Solutions for Mobile Phones: Internet Protocol Multimedia Systems (IMS) Software Development Kit (SDK), 2007. 2 Pages. (downloaded off of the Internet from site http://www.ecrio.com/products/ims_library.html on Feb. 1, 2008).
Ecrio, Inc. Ecrio IMS Client Framework (Version 1), undated. 2 Pages.
Ecrio, Inc. Ecrio IMS Client Framework (Version 2), undated. 2 Pages.
Nvidia Corporation. Variable SMP (4-PLUS-1 TM)—A Multi-Core CPU Architecture for Low Power and High Performance (Whitepaper), 2011 [online] [retrived on Oct. 23, 2013]. Retrieved from the Internet <URL:http://www.nvidia.fr/content/PDF/tegra_white_papers/Variable-SMP-A-Multi-Core-CPU-Architecture-for-Low-Power-and-High-Power-Performance.pdf>. 17 Pages.
United States Patent and Trademark Office. Office Action: U.S. Appl. No. 12/322,843, Feb. 10, 2012. 38 Pages.
United States Patent and Trademark Office. Office Action: U.S. Appl. No. 12/322,843, Sep. 19, 2012. 33 Pages.
United States Patent and Trademark Office. Notice of Allowance and Fee(s) Due: U.S. Appl. No. 12/322,843, Oct. 25, 2013. 34 Pages.
United States Patent and Trademark Office. Office Action: U.S. Appl. No. 12/751,881, Nov. 14, 2012. 29 Pages.
United States Patent and Trademark Office. Office Action: U.S. Appl. No. 12/751,881, Aug. 7, 2013. 15 Pages.
United States Patent and Trademark Office. Office Action: U.S. Appl. No. 13/527,571, May 24, 2013. 46 Pages.
Ecrio, Inc. Preliminary Amendment: U.S. Appl. No. 14/108,262, Jan. 16, 2014. 13 Pages.
Ecrio, Inc. Reply to Office Action: U.S. Appl. No. 14/108,262, May 1, 2015. 17 Pages.
Ecrio, Inc. Reply to Office Action: U.S. Appl. No. 14/284,136, Apr. 3, 2015. 18 Pages.
Ecrio, Inc. Ecrio Video Share (VS) Framework, undated. 2 Pages.
Ecrio, Inc. Ecrio VoIP-VCC Engine, undated. 2 Pages.
European Patent Office. Office Action: European Patent Application No. 09 709 147.4, Jan. 30, 2014. 4 Pages.
United States Patent and Trademark Office. Office Action: U.S. Appl. No. 14/108,262, Mar. 6, 2015. 34 Pages.
United States Patent and Trademark Office. Office Action: U.S. Appl. No. 14/284,136, Dec. 3, 2014. 40 Pages.
United States Patent and Trademark Office. Office Action: U.S. Appl. No. 14/284,136, Jul. 7, 2015. 40 Pages.
WIPO. International Preliminary Report on Patentability: International Application No. PCT/US2013/046437, Dec. 31, 2014. 6 Pages.

SYSTEM, METHOD AND APPARATUS FOR CONTROLLING MULTIPLE APPLICATIONS AND SERVICES ON A DIGITAL ELECTRONIC DEVICE

CROSS-REFERENCE TO RELATED APPLICATIONS

This application is a continuation of U.S. patent application Ser. No. 12/322,843, filed Feb. 7, 2009, now U.S. Pat. No. 8,613,002 issued Dec. 17, 2013, which claims the benefit of U.S. Provisional Patent Application Ser. No. 61/065,238 filed Feb. 8, 2008, all of which hereby are incorporated herein in their entirety by reference thereto.

BACKGROUND OF THE INVENTION

1. Field of the Invention

This invention relates generally to systems, methods and apparatus for controlling digital electronic devices, and more particularly for controlling applications, services, platforms, and/or extensions on a digital electronic device.

2. Description of the Related Art

FIG. 1 illustrates a communication network, in simplified form for explanation. The communication network includes, for example, a conventional cellular network 10 which may include, for example, GSM, GPRS, EDGE, cdmaOne, cdma2000, WCDMA, and UMTS networks, although other access technologies can also be used. The cellular network 10 is operated by mobile network operators (not shown), which provide voice and/or data services to customers. Three illustrative devices are shown connected to the cellular network 10, namely a cell phone 11, a smartphone 12, and a mobile PC 13 with a cellular network connection device installed. The communications network also includes an IP network and service infrastructure 20, which is interconnected with the cellular network 10 through a gateway (not shown). The IP network 20 provides IP services through both wired and wireless means. Six networked devices are shown connected to the IP network 20, illustratively a server 21, a game console 22, a digital audio/video device such as a set-top-box 24 to which a digital television 23 is connected, a smart digital appliance 25 (such as, for example, a security device, a web camera, or a smart kitchen appliance), a desktop personal computer 26, a mobile personal computer 27 (such as, for example, a laptop, tablet, or netbook computer), and a smartphone 28. Each of the digital electronic devices include suitable software that interfaces with various user applications on the device and functions as a user agent to establish, modify, and terminate communication sessions between any of the networked digital electronic devices, and across different networks.

Services are provided by the network operator and service providers through the network. Services are accessed, delivered, and used through specialized technologies, network and application protocols, and content methods, and operate using various standards. Some functions and applications operate from device-to-device directly and others are originated by servers in the service infrastructure or by servers connected through the internet. The applications on the devices must support the specific standards and technologies used by the various networks, services, content, and other device applications.

Digital electronic devices such as devices 21-28 include application software, which typically is written for the particular type of digital electronic device. Such application software tends to be complex, since it includes not only the user interface and application functions that are specific to the application or service, but also elements that are specific to the end-to-end connection, delivery, and processing of protocols and content as well as the device platform, operating system environment, application environment, and the network and service systems used. Unfortunately, the difficulty of developing device applications that individually deal with the complexity of managing and supporting a variety of device platforms, application environments, technology and standards, networks, and service systems has lead to long development and deployment cycles, high cost and risk, and inefficient use and duplication of resources for application developers, device suppliers, and service providers. In addition, this high time and cost has lead to single purpose applications and services for new service and application capabilities. The monolithic and vertical nature of these complex applications also limits the available developer community that is capable of creating the applications, increases the cost for specialized training and tools, and reduces flexibility for providers and users to adapt and repurpose the capabilities and functions. They are unable to easily add new applications or user interfaces that support additional uses, adapt for new markets or personalize the use to individual needs or usage styles. This limited application support and availability limits the adoption, use, and economic value of the functions and services.

The technologies and standards used for applications and services continue to evolve and change. As networks, service applications, and content changes, the applications are also changed to include these new requirements, technologies, and standards. Significant time and investment is expended to change each application, to test each application in each device and application environment, and test each application with the various network and service application systems. This adds considerable time, risk, and cost to technology and functional upgrades, and slows transitions to new standards and capabilities.

The number and type of devices has grown dramatically, and each device category, manufacturer, and service may have a wide range of device platforms and operating systems, and multiple application environments, and are required to interoperate across many networks and systems. Since applications are device and service specific, this has limited the availability and use of new functions and capabilities to selected devices. The time and investment required to implement a new capability across an entire, complex device portfolio continues to increase as the range and type of devices increases. Developers, device suppliers, and service provider need a better means to support many device types and models with lower incremental time, cost, and risk to fully utilize investments and to offer services and value to more customers and markets.

The industry has different sets of technology, products, providers and business models that must come together to deliver complete end-to-end services and applications. These may be referred to as industry ecosystems. The primary ecosystems include device platforms, application environments and developer communities, technology and standards, and networks and service infrastructure systems.

The device ecosystem includes components and platforms which vary by category and supplier, operating system environments, and various electrical, software, mechanical and industrial design elements. They include application environments such as native operating system specific application environments such as Windows, MacOS, Linux, Symbian, BREW, and a variety of specialized real-time-operating systems. There are multiple versions and adaptations of general procedural runtime application environments such as Java, declarative runtime application environments such as Adobe Flash and Air, WebKit Widget Runtime, Yahoo Widgets, and browser based application environments such as Google Gadgets and AJAX enabled mobile and PC browsers. Each of these environments have unique capabilities, advantages and disadvantages, and are suitable for different levels and types of applications. They require specific knowledge and tools and tend to have communities of developers based on the relative number of devices and services that support them and the economic value of developing for those environments.

Many devices include more than one application environment. For example, most smartphones include a native programming environment such as Windows Mobile, Symbian, or Linux, and these may be the preferred environments for core applications that are performance sensitive, security sensitive, or need access to specific platform and OS resources not available in other environments. These are typically very complex applications written in the 'C' programming language using the specific platform and operating system resources available, and require special knowledge and skill for the device, programming environment and tools, service systems, specialized technologies, and applicable standards. The device may also include a procedural runtime application environment such as Java. These provide a higher level procedural language and are generally less device specific. However, the functions of the applications are limited to the capabilities supported by the application environment. These environments generally do not provide low-level access to device resources. The applications tend to require less modification to use on other devices with a compatible environment, but they are usually less capable and perform slower than native applications. The device may also include a declarative runtime environment. These environments use more web-like programming and content methods such as scripting and markup languages. Adobe's Flash and the industry standard Asynchronous Java and XML (AJAX) based environments are common examples. In some cases, these application environments may also be installed by the user if they are not included on the device. This means that the very large community of web developers is capable of quickly developing applications for the environment and dynamically delivering them to the device as needed or desired. Unfortunately, the limited programming and application management capabilities of these environments and their lack of access to advanced and specialized functions has limited their use in developing applications for sophisticated services and use that require more specialized capabilities.

The current situation requires developers to address all the complex ecosystem requirements in each application and then to modify the entire application for each combination of device, technology and standards, network, and service. In general, the environments that have the largest developer communities are easier to develop in, and provide more portability across devices and services. However, they also have limited capabilities and are slow to support new technology and standards. This limits the availability of applications for specific needs and markets and decreases the economic value of the capabilities.

BRIEF SUMMARY OF THE INVENTION

To overcome these and other disadvantages in the art, and to enable the capabilities described, a service and applications controller and related apparatus and methods are described with various capabilities that are useful for enabling and simplifying application development, decreasing development and testing time, and facilitating the availability and portability of applications for many different types of digital electronic devices.

One embodiment of the invention is a service and application controller for a digital electronic device, comprising a set of core modules comprising a communication module, an application module, an extension module, a state module, a server module, a data management module, a policy module, a signaling module, and an administration module; a platform interface comprising a plurality of platform API's for interfacing with a plurality of device platform environments, the platform interface providing a layer of abstraction for the device platform environments through the platform API's; a service and network interface comprising a plurality of service API's for interfacing with a plurality of services, service infrastructures, and networks, the service and network interface providing a layer of abstraction for the services, service infrastructures, and networks through the service API's; an extension interface comprising a plurality of extension API's for interfacing with a plurality of application engines and enablers, the extension interface providing a layer of abstraction for the application engines and enablers through the extension API's; an application interface comprising a plurality of application API's for interfacing with a plurality of applications and application environments, the application interface providing a layer of abstraction for the applications and application environments through the application API's, and comprising a plurality of application logic controllers ("ALC's") for translating between the application API's, the platform API's, the service API's, and the extension API's; wherein the set of core modules is shared by the platform interface, the application interface, the extension interface, and the service and network interface.

Another embodiment of the invention is an application controller for a digital electronic device, comprising a set of one or more modules selected from a group comprising a communication module, an application module, an extension module, a state module, a server module, a data management module, a policy module, a signaling module, and an administration module; and an application interface comprising a plurality of application API's for interfacing with a plurality of applications and an application environment, the application interface providing a layer of abstraction for the applications and the application environment through the application API's, and comprising a plurality of application logic controllers ("ALC's") for translating between the application API's; wherein the set of modules is shared by the application interface.

Another embodiment of the invention is an application controller for a digital electronic device, comprising a set of one or more modules selected from a group comprising a communication module, an application module, an extension module, a state module, a server module, a data management module, a policy module, a signaling module, and an administration module; and an application interface comprising a plurality of application API's for interfacing with a plurality of applications and a plurality of application environments, the application interface providing a layer of abstraction for the applications and the application environments through the application API's, and comprising a plurality of application logic controllers ("ALC's") for translating between the application API's; wherein the set of modules is shared by the application interface.

Another embodiment of the invention is a controller for a digital electronic device, comprising a set of one or more modules selected from a group comprising a communication module, an application module, an extension module, a state module, a server module, a data management module, a policy module, a signaling module, and an administration module; and a platform interface comprising a plurality of platform API's for interfacing with a plurality of device platform environments, the platform interface providing a layer of abstraction for the device platform environments through the platform API's; wherein the set of modules is shared by the platform interface.

DETAILED DESCRIPTION OF THE INVENTION, INCLUDING THE BEST MODE

Figure 1:
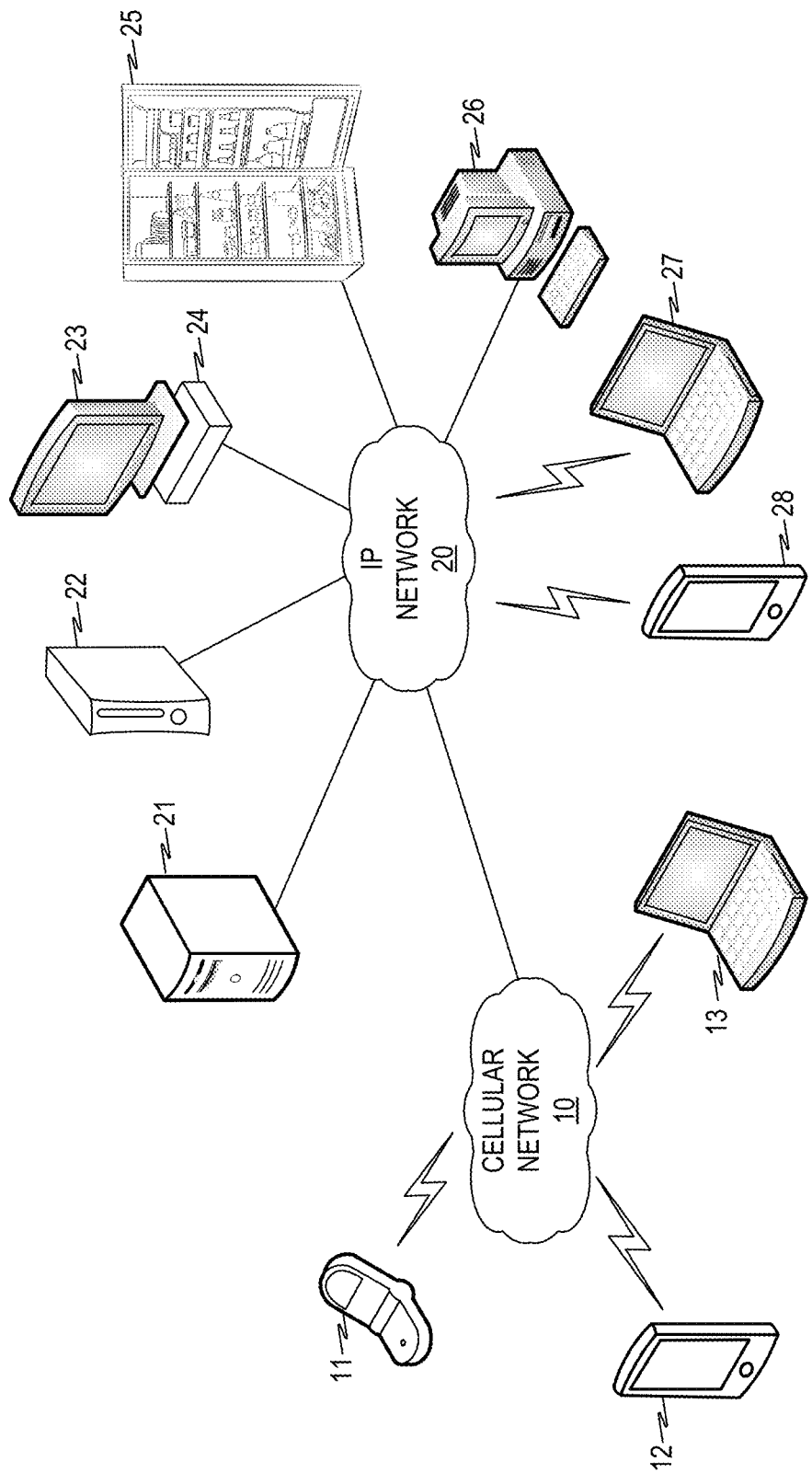
FIG. 1 is a schematic diagram of a communications network and associated digital electronic devices.
Figure 2:
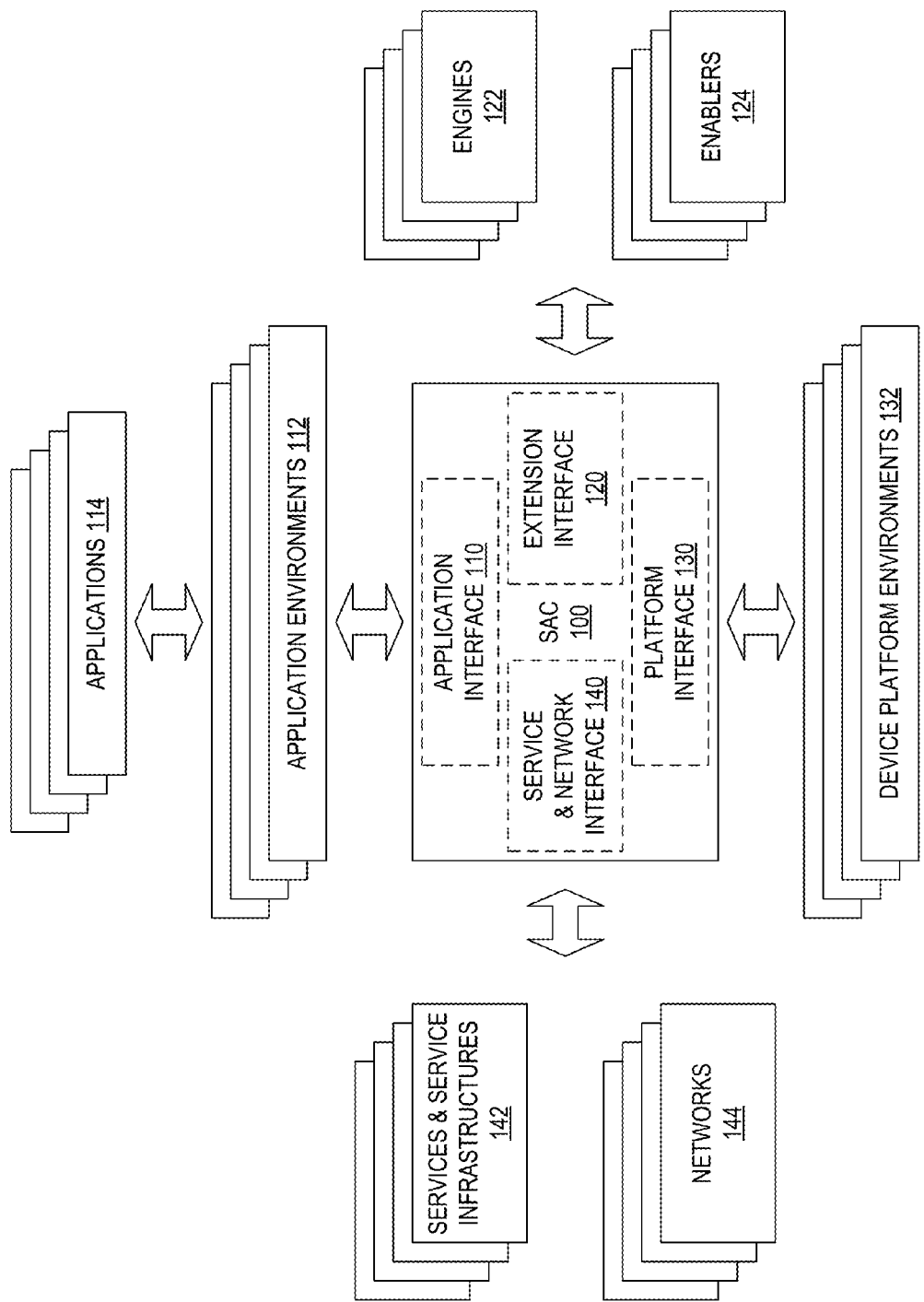
FIG. 2 is a schematic block diagram showing interactions between a services and applications controller and four environments with which it interacts.

FIG. 2 shows a services and application controller ("SAC") 100 suitable for digital electronic devices. The SAC 100 includes four interfaces which respectively interact with four different environments, namely an application interface 110 that interacts with application environments 112 and applications 114, an extension interface 120 that interacts with engines 122 and enablers 124, a platform interface 130 that interacts with device platform environments 132, and a service and network interface 140 that interacts with services and service infrastructures 142 and with networks 144. The SAC 100 provides a set of core functions and abstracts the environments from each other, which enable interactions between these environments without requiring that the environments be aware of specific aspects of the other environments for the interactions.

Figure 3:
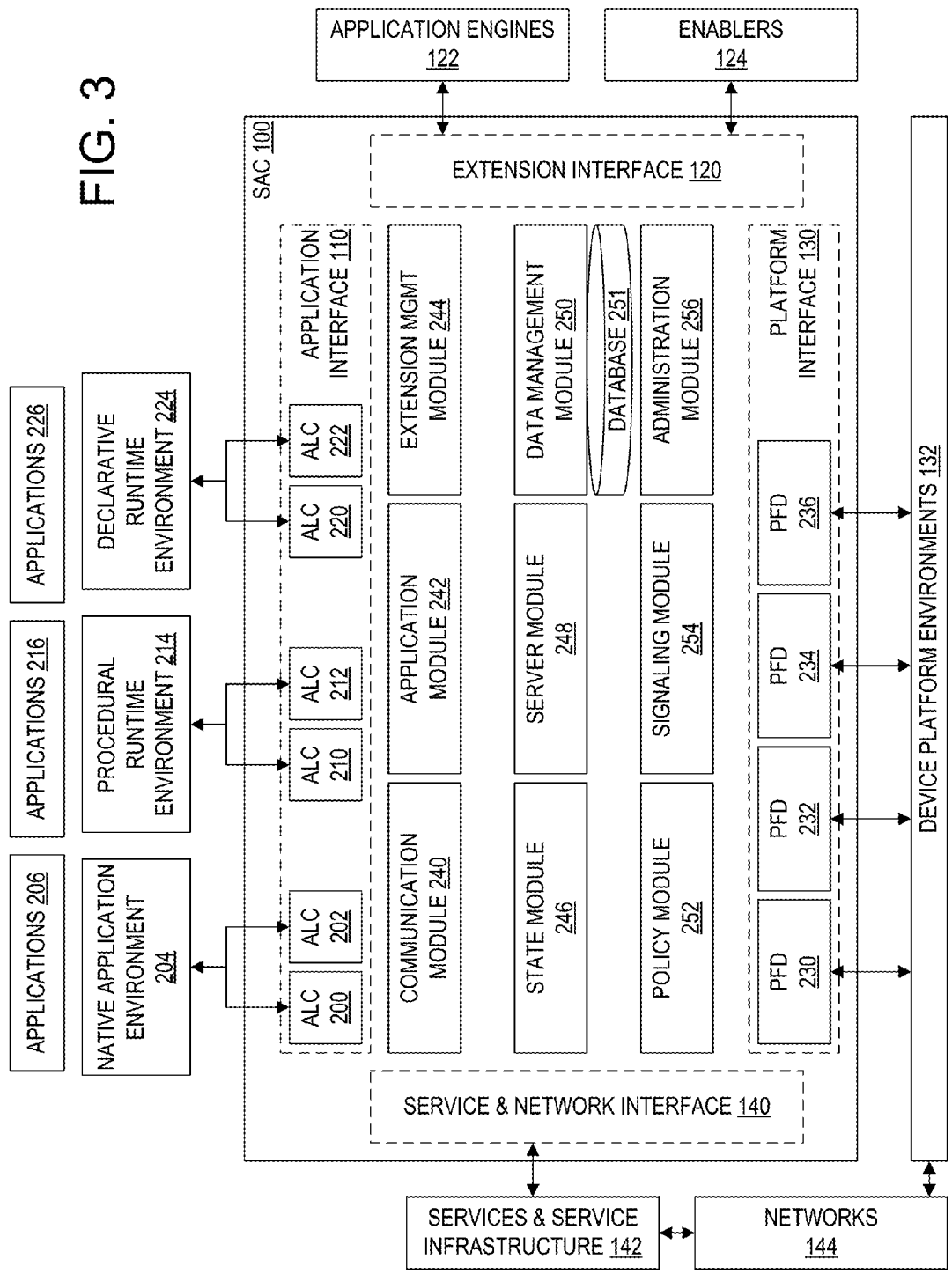
FIG. 3 is a schematic block diagram of an illustrative implementation of a services and applications controller architecture, including a common set of functions and its various interfaces.

FIG. 3 provides a more detailed view of the core functions and interfaces of the SAC 100. The SAC 100 provides a common set of functions and capabilities that are shared by the four ecosystems, and supports (a) modular and flexible application engine and technology and standards enabler modules; (b) multiple operating systems and platform environments without changes to the core software; and (c) interoperation with and abstraction from various network and service infrastructure systems. The Application Interface 110 of the SAC 100 includes Application Logic Controllers (ALC's) such as 200, 202, 210, 212, 220 and 222. The ALC's 200, 202, 210, 212, 220 and 222 include application program interfaces (API's) and application logic, which enables the SAC 100 to support a set of application functions and different application environments and applications, such as a native application environment 204 and associated applications 206, a procedural runtime environment 214 and associated applications 216, and a declarative runtime environment and associated applications 226. The SAC 100 also includes an Extension Interface 120, which enables the SAC to interact with many different Application Engines 122 and technology and standards Enablers 124. The SAC 100 also includes a Platform Interface 130, which enables the SAC 100 to interact with many different device platform environments 132. The Platform Interface 130 includes Platform Drivers (PFD's) such as PFD 230, PFD 232, PFD 234 and PFD 236 that support integration with various platform resources and functions used by SAC 100 and the applications 206, 216 and 226, the application engines 122, and the enablers 124 that use the SAC 100. The SAC 100 also includes a Services and Network Interface 140, which allows the SAC 100 to interact with many different services and service infrastructure systems 142, and many different types of networks 144.

The abstraction methodology may be better understood from the following example. A function common to applications is to get a video stream from a platform codec. Different platforms use different API's or sets of API's and different parameters for this function, and different application programming languages use different instructions for this function. To simplify application programming, API's are provided in the application interface 110 that are abstracted from each supported application programming language, and API's are provided in the platform interface 130 that are abstracted from each type of supported platform. The SAC 100 translates between the relevant API in the application interface 110 and the relevant API in the platform interface 130. For example, when an application programmer wishes to get a video stream from a platform codec, the programmer need only code the instruction in any supported programming language using the appropriate API in the application interface 110 for that language. Advantageously, the programmer need not have any particular knowledge of how the function is performed by the platform. This is because during operation, the SAC 100 through an application module 242 receives the request from the application, calls the appropriate platform driver for the platform being used, and passes the parameters between the API in the application interface 110 and an API in the platform interface that is appropriate for the platform in use. This process is known as "translation." The appropriate platform driver in the platform interface 130 then accesses the platform using the appropriate calls and protocols for the platform to get the video stream.

In a similar manner, the extension interface 120 and the service and network interface 140 contain "abstracted" API's, and the SAC 100 is able to translate between any of the interfaces 110, 120, 130 and 140. In the case of the extension interface 120, for example, when a new engine is "plugged into" engines 122, it publishes its procedures and parameters to the extension interface 120.

Core Functions of the SAC 100

The SAC 100 includes core functions. The SAC 100 shown in FIG. 3, for example, illustratively includes the core functions of a communication module 240, an application module 242, an extension management module 244, a state module 246, a server module 248, a data management module 250 which has an associated database 251, a policy module 252, a signaling module 254, and an administration module 256.

The communication module 240 is responsible for managing resources for channels used to communicate with services and service infrastructure 142 and networks 144. It uses the platform-specific functions implemented in various platform drivers (PFD's), illustratively PFD 230, PFD 232, PFD 234 and PFD 236 in the Platform Interface 130, to obtain the available local IP addresses and ports for channels. When the available local IP parameters (address or port) change, the communication module 240 will be notified by a platform driver. Subsequently, the communication module 240 recreates these channels for future communication needs. The communication module 240 also creates UDP or TCP connection with the network.

The communication module 240 includes four key functions, namely session management, service management, network management, and quality of service (QoS). With respect to session management, when an application or engine needs to communicate with a network element such as, for example, a server, the communication module 240 creates a session and maintains the relevant information about the session, such as creation time, protocol type (for example, UDP or TCP or HTTP), network type (for example, 2G or 3G Cellular, or 802.11 WLAN), and QoS parameters such as the required bandwidth and bit rate needed for communication. The communication module also shares this session data with other modules within the SAC 100, upon request. When communication is no longer needed, the communication module 240 releases the session and frees up memory used to keep the session data. With respect to service management, when data needs to be sent over to a network element, the communication module 240 determines the protocol standard to be used and calls appropriate platform-specific API's to send data. For example, if an application needs to send data over UDP, the communication module 240 calls a suitable platform driver function to send the data over UDP. The communication module 240 also manages normal and abnormal conditions of the communications, such as error recovery and retries. With respect to network management, the monitoring of network connections on the device is done using platform-specific functions, and a register is used for notifications when network connection status change. In this event, the platform notifies the communication module 240 which in turn notifies the appropriate application or engine for further processing. This is very useful for supporting services that span multiple networks, such as when there is a Voice over IP call that originates using a cellular network, but needs to be handed over to a WLAN network due to lack of cellular coverage. With respect to Quality of Service ("QoS"), this is an important parameter which is needed for many communication types such as Voice or Video over IP. There are several parameters that determine the quality of service. The available IP bandwidth, the media bit rate, and the type of codec (Compression/Decompression) used determines QoS. The communication module 240 obtains the QoS details from the device (such as codec) and negotiates with the network for guaranteed bandwidth for the communication. When network notifies the device about change in QoS, the communication module 240 informs the application or engine to select the appropriate codec on the device for smoother communications.

The application module 242 is the primary interface to applications through application logic controllers ("ALC's") such as ALC 200, ALC 202, ALC 210, ALC 212, ALC 220 and ALC 222. The application module 242 provides deployment and un-deployment of applications within the SAC 100. It also maintains state of the application, filter criteria used to route information or signal to and from applications, and a table including registered applications and application mappings. In addition, the application module 242 is also responsible for resolving conflicts among applications, and queuing and prioritizing requests from applications to various other modules within the SAC 100.

The application module 242 provides deployment and un-deployment of applications. This is very similar to the register/un-register functions normally described in operating systems. An application first deploys with SAC 100 using the application module 242. During the deployment process, the application passes a number of configuration parameters to the application module 242 in a Deployment Descriptor (for example, in a XML document format). The application module 242 parses this deployment descriptor file, and registers the application with the SAC 100. When the application is no longer needed, the application can be "un-deployed" from the application module 242. During the un-deployment process, the application module 242 removes the registration and frees up the resources used by the application.

The application module 242 uses filter criteria to determine which application an incoming message, signal or data belongs to. The filter criterion is typically specified in the deployment descriptor. These include a collection of rules that, when applied, identify a specific application or engine. For example, if a network element sends information or data targeted to an application, it is first received by the Communication module and these rules are applied by Application Manager and sent to the Server Module for routing to the appropriate application or engine.

The application module 242 includes a conflict resolution feature which is implemented as a co-operative system between the various applications 206, 216 and 226, the application engines 122, and the SAC 100. In one illustrative implementation, whenever a conflict is encountered, the SAC 100 informs the corresponding application or application engine to take action to resolve the conflict. This feature is policy and data-driven, and may be customized to suit the needs of service and application. Conflict resolution policies may be transmitted and provisioned using Policy module 252 in the SAC 100. When the SAC 100 receives the updated conflict resolution policy document, the updated policy parameters are used for future conflict resolution administration.

The application module 242 provides priority queuing of requests, responses and notifications. In particular, the SAC 100 prioritizes outgoing or incoming responses or incoming notifications based on the priority policy and may include rules based processes that monitor changing conditions in the network or device. When an application is deployed with the application module 242, it sets its priority for sending and/or receiving messages to/from the network as part of a deployment descriptor. A policy document (for example, an XML format document) is provisioned using the Policy Module 252, for example, a Voice over IP ("VoIP") application may set its priority to high, since it is synchronous, and an Instant Messaging ("IM") application may set its priority to medium since it is asynchronous. In this scenario, when a user tries to call someone using VoIP and send a message using IM, and both applications simultaneously request processing, the SAC 100 prioritizes the VoIP call and delays sending of the text message. Similarly, if there is an incoming signaling message for the VoIP and IM applications at the same time, the SAC 100 prioritizes the VoIP message and sends it first before delivering the message to the IM application.

The extension module 244 is responsible for managing integration and support of application engines 122 and enablers 124. The extension module 244 loads an extension for an application when the application manager sends a request for it. Based on the configuration parameters of the extension, the extension module 244 may also load any other extensions that the current extension needs. Loading may be done from on-platform sources such as memory or storage devices, or from a server over the network. The extension module 244 also maintains a table that maps the applications and the extension(s) they are using. When an application invokes a function in the extension using the extension module 244, the extension module 244 validates the existence of such a function before invoking. The extension module 244 supports executing the functions in extensions using a single thread in a serial manner, or in parallel using multiple threads. The serial or parallel mode of execution depends on the support of threads in the platform.

The state module 246 is responsible for state management, including aggregating state, and sharing state information among and between applications 206, 216 and 226, application engines 122, services and service infrastructure 142, and device platform environments 132. The state module 246 interfaces with other managers and interfaces within the SAC 100 to share state information among applications, engines, device modules and services.

The state module 246 may be implemented as a shared state manager using various techniques, including the pointer method and the database method. In the pointer method, each of the application engines 122 stores and maintains its own state information (such as, network registration state or location), and publishes the pointer or pointers to the state information to the state module 246. The state module 246 maintains a table of these state pointers. When an application or another engine queries the state module 246 for the state information, the state module 246 uses the pointer to retrieve the state information from the relevant application engine or service and shares it with the application. In the database method, the state provider submits the state information to the state module 246 and it is stored by the state module 246 in the SAC database 251 through the database management module 250. The state module 246 aggregates the state information, either in a storage-based database or in-memory database, and maintains the integrity of the state information. When an application, service, or another engine queries the state module 246 for state information, the state module 246 retrieves the state information from the database and shares it. Both methods provide the option to perform policy management for any state data request to control access.

The state module 246 uses the application interface 110 when state information and data needs to be shared among multiple applications within applications 206, 216 and 226. For example, a Presence Enabled Phonebook ("PEB") application may store and share a PEB through the database management module 250 with other authorized applications. Authorization for access may be administered through the policy module 252. The PEB application may receive state changes such as presence status updates from the user or from a presence engine. The PEB application may update the PEB through the application interface 110. The PEB application may signal a state change to the authorized applications using the PEB, such as to an Instant Message application through the state module 246 and the application interface 110.

The state module 246 uses the extension interface 120 when state information needs to be shared among multiple engines 122 or enablers 124. For example, during a network authentication process, an authorization engine (not shown) might have stored keys in the SAC 100. When another engine such as a commerce engine (not shown) needs that key for transaction purposes, the commerce engine may query the state module 246 using the extension interface 120 and obtain the key.

The state module 246 uses the service and network interface 140 when state information needs to be shared with elements in the networks 144. For example, when a network needs to know whether an application is active or not, it may query the state module 246 using the service and network interface 140 and obtain the information. The information can be passed using standard protocols such as UDP, TCP or HTTP, or using an application level signaling protocol such as SIP.

The state module 246 uses the platform interface 130 when state information needs to be shared with other modules in the device or platform. This is accomplished using either a pull or push method. In the pull method, the device can query the state module 246 for the information and obtain it. The information may be pushed to the device using a call back or a notification channel by the state module 246. For example, a multimedia framework on the device may need to know if there are any multimedia applications deployed and active within the SAC 100. In this case, the multimedia framework would use the platform interface 130 to obtain the information from the state module 246. In another example, the platform may provide location information in the form of state data to the SAC 100 for use by authorized applications, engines, and services.

The data management module 250 in the SAC 100 is responsible for management of data within the SAC 100, as well as providing data sharing services from the interface components such as the applications 206, 216 and 226, and the application engines 122. The data base methodology of the data management module 250 may be varied based on the implementation requirements. For example, the data base can be in-memory on devices that do not have an external storage device, such as set-top-boxes and mobile phones. The data base can be a persistent data base on a storage device embedded or connected to the device, such as a flash memory card or disc drive. Various database management methods such as SQL, Access, Oracle, IBM database systems may be employed. The data management module 250 abstracts this mechanism through the various SAC interfaces 110, 120, 130 and 140, so that the applications and functions using the data management module 250 are not exposed to the underlying method. To store or share data, an application (e.g. 206, 216, 226) or an application engine (e.g. 122) defines a structure using a data structure document. The owning application may also set policy for access and control of the defined data through the policy module 252. The applications authorized to use the defined data may then access the database through the relevant SAC interface.

The data management module 250 is also used to store internal data from various modules of the SAC 100. For example, the state module 246 uses the data management module 250 to store state information obtained from other components. Likewise, the application module 242 may store details about the applications deployed and their parameters in the database 251 using the data management module 250.

The policy module 252 handles the policy functions of the SAC 100, which are used to provide operational management parameters, access control, and administer security and privacy policies. Policies and parameters may be established by the user, network provider, service provider, device, or technology and standards provider. For example, a network operator and service provider may set policy for use of the network, access to service systems, or control access to sensitive state or application data. These policies are managed by various functions within the SAC 100, such as the network and session management functions, the state management function, data registration and application access in the application logic control layer. For example, based on user privacy policy or operator policy, an application may be required to submit a service provider issued key or certificate to access designated API's and data.

The policy module 252 is responsible for policy management. One or more policy profiles may be present on the digital electronic device, including policy profiles such as User Profiles, Service Provider Profiles, and Third Party Profiles approved by a service provider. The profiles contain access control information for accessing API's, state data, network services, network and service delivery Quality of Service, user data, and so forth. The policy profiles may optionally be certified using industry standard security mechanisms such as key exchange and certificates issued by well established authorities. User Profiles typically include policies for privacy and security for data and applications, such as "Share my presence or location information to a set of authorized applications." Service Provider Profiles are service provider provisioned policies for access, privacy, and security for items managed or accessed via the SAC.

Policy provisioning for the policy module 252 may be performed at time of manufacture, at time of sale, on-line, or over the air by sending policy documents to the SAC 100, or by the user by setting policy parameters. For example, to set a policy on an OMA (Open Mobile Alliance) Device Management enabled mobile device, the service provider may use an existing OMA-DM enabled Device Management System to manage the policy documents and perform secure, authenticated delivery of a provider specified policy document, typically using an XML structure. The SAC 100 is registered with the on-device OMA-DM application to receive provisioning documents of that specific type sent over-the-air. An application engine is integrated with the SAC 100 that serves as the "handler" for the policy document type, and performs the parsing of the document and provisioning of the policy parameters managed in SAC.

The signaling module 254 is responsible for parsing signals from applications, engines, device and services, and for routing them to appropriate destinations. The destination could be an application (e.g. 206, 216, 226), engine (e.g. 122), device (e.g. 132), or service (e.g. 142). The signaling module 254 may use an enabler to parse the signal message, for example, if the signals are embedded in a standard protocol. Alternately, the signals can be simply a signaling message (for example, an XML data document) that contains information for the recipient. In this example, the signaling module 254 publishes the XML schema so applications, engines, device or services can use them to construct signals.

Applications 206, 216 and 226 and engines 122 may declare the signals to route and accept via the application interface 110 when performing the deployment process with the SAC 100. This is done using the application interface 110 and the deployment descriptor. The application module 242 routes the signals (typically commands) to the signaling module 254. For example, a camera application can publish its signals (start capture, stop capture, etc) to the SAC 100. A messaging application can query the signaling module 254, obtain the signals supported by the Camera application, and issue a signal to the signaling module 254 that reaches the Camera application.

An engine (e.g. 122) may declare signals requested to be routed to it via the extension interface 120 when performing the deployment process with the SAC 100. This is done using the extension interface 120 and the deployment descriptor. The extension module 244 routes the signals to the signaling module 254. For example, a payment engine (not shown) may publish its signals (get balance, pay balance, etc) to the SAC 100. A payment application (not shown) may query the signaling module 254, obtain signals supported by the payment engine, and issue a signal to the signaling module 254 that would reach the payment engine.

Using the service and network interface 140, an application (e.g. 206, 216, 226) or engine (e.g. 122) may declare signals requested to route to it from the network or network based services via the SAC 100 when performing the deployment process. This is done either using the application interface 110 or the extension interface 120, and the deployment descriptor. When the signaling module 254 receives a message from the network (e.g. 144), it filters the message based on the filter criteria and sends the message to the (e.g. 206, 216, 226) or engine (e.g. 122). For example, in an IMS enabled network, there is a network element called P-CSCF which routes incoming SIP messages to application servers based on a filter criteria stored in the network. The signaling module 254 performs a similar function in the device when it is enabled for IMS based communications.

The administration module 256 is responsible for keeping track of the internal functions of the SAC 100. The administration module 256 accesses data and information stored using the data management module 250, and makes it available to an administration application (not shown). The administration application is a privileged application that can access the administration module 256 using special API's. These API's are used to determine the number of applications deployed, active, type of communication channels open, active, and other data stored in the database 251 or provided by the various core functions in the SAC 100 and the extensions.

The server module 248 is responsible for invoking other modules in the SAC 100 based on requests from any of the modules or the interfaces. When applications or engines are deployed with the SAC 100, the server module starts a timer and maintains a heart-beat communication with them. This allows the SAC 100 to maintain status and determine whether the application or engine is active and responsive. When the application or engine terminates during the normal un-deployment process, the server module 248 stops the timer and the heart-beat mechanism. If the application terminates without a normal un-deploy, then the application state is set as an unexpected or abnormal termination.

The server module 248 is also responsible for performing discovery requests to the SAC 100 to provide capabilities information to applications, engines, services, and device platforms. Available extensions provided through and within the SAC 100 are reported to the requester. This is done by look-up of the information provided and tracked in the deploy process and through a discovery process for standardized or bundled extension files that are registered with the extension module 244.

The server module 248 is also responsible for passing data or signals from the SAC 100 to applications or engines using Inter-Process Communication. The IPC mechanism varies from platform to platform. In some platforms, the IPC is done using local sockets. In other platforms, it is done using pipes. The server module 248 is independent of the implementation of IPC, which facilitates the higher level functions needed to exchange date among applications and engines with the SAC 100.

The Platform Interface 130

In order to support porting to multiple operating systems and platform environments without changes to the core software, the SAC 100 provides platform independence for the functions of the SAC 100 and the elements that are integrated to the SAC 100. Specifically, the architecture of the SAC 100 includes the platform interface 130, which is a platform abstraction and porting layer that includes platform drivers ("PFD"). The platform interface 130 interfaces platform-specific operations, such as memory allocation and media playback, and abstract them from the applications. Platform drivers may handle OS services, which are features and functions typically provided by the operating system such as memory allocation and file system operations; and non-OS services, which are features and functions that typically are not provided by the operating system, such as compression and de-compression of media packets and setting quality of service parameters in a network transaction. Illustrative operating system and platform resources include UDP/TCP services, PDP services, HTTP services, media codecs, operating system services, and embedded applications such as messaging and location.

There are two types of platform driver API's, basic and advanced. Basic APIs are typically available in general purpose operating systems such as Windows, Windows Mobile, Symbian, and Linux. Some of the basic APIs include, but are not limited to memory allocation and management functions, string management functions, communication functions such as Socket, file Input and Output functions, thread management functions including Mutex and Semaphore, and timer management functions such as start/stop timers. Advanced API's usually involve integration with 3rd party software modules on the platform. Some of the advanced APIs include, but are not limited to media management such as Codec, Media Player functions, network management such as Quality of Service setup, optional application launcher functions in a multithreaded platform, inter Process Communication functions, functions to read or access SIM toolkit functions, functions to access OMA Device Management (DM) functions, and protected storage in memory or SIM card to save data securely. This is particularly useful when sensitive information such as Digital ID or Digital Wallet data are kept and managed in secured memory partitions or devices. Advantageously, once the PFD layer (e.g. PFD's 230, 232, 234, 236) is developed in the platform interface 130, it is relatively easy to adapt to different platforms and usually requires little additional work unless the basic platform functions change.

The Application Interface 110

The SAC uses the application interface 112 to enable a variety of applications (e.g. 206, 216, 226) in multiple environments, including procedural and declarative, and to establish application programming interfaces ("API's") suitable for various categories of applications and application environments. An application programming interface or API is a set of routines, data structures, object classes and/or protocols provided by libraries and/or operating system services in order to support the building of applications. Application environments include native application environment 204, such as Windows Mobile, Symbian and BREW, for applications written in languages such as C/C++, and procedural runtime environments 214 such as Java. Declarative runtime environments 224 make use of web-like scripting and markup languages such as AJAX based widget environments like Yahoo Widgets and Webkit Run-Time, proprietary environments like Adobe's Flash Lite, and browsers enabled with AJAX or proprietary plug-ins like Microsoft Silverlight and Adobe Flash and Air.

The application interface 110 includes Application Logic Controllers (ALC's) for various categories of functions and various application environments. The ALC's may vary to support the conventions and capabilities of the environment. For example, ALC's such as 200 and 202 for native application environments 204 usually translate between the API's used in the SAC 100, the application engines 122, and the enablers 124, and perform application logic to further abstract the application from the complexities of the underlying technology or variations in implementations. ALC's such as 210 and 212 that support procedural runtime environments 214 like Java may be either the same ALC's used for the native environment with bindings created to enable the application environment's virtual machine with the extended functions, or they may add application logic to perform functions for the runtime applications that are not supported or easily performed in the environment. Similarly, ALC's such as 220 and 222 used to add extended functions to declarative runtime environments 224 may be the same ALC's used for the other environments with bindings added for the selected functions, or the ALC's may include most of the application logic needed to perform common functions for the category so that the declarative application need only perform the user interface functions and basic application logic. Using multiple derivative ALC's, the level and type of application interface can be varied for the different environments supported. In most cases, a common set of API's available to all environments is defined and supported by the ALC's, and then additional levels and functions may be included in others. For example, the policy module 252 and the state module 246 function in the SAC 100, and selected application functions may be required in all ALC's and environments, but access to specific engines and enablers may be limited to certain environments. Similarly the ALC's for native application environment 204 may provide a large set of low-level API's, while the ALC's for the declarative runtime environments 224 may include additional application logic so that a simplified set of higher-levels API's is provided for less capable environments.

The Service and Network Interface 140

The architecture of the SAC 100 includes the service and network interface 140 and the communication module 240, which includes functions such as connection management, quality of service (QoS) management, and session management. The SAC 100 abstracts variations in service applications and service/network infrastructure (e.g. 142 and 144), device applications (e.g. 206, 216, 226) and application environments (e.g. 204, 214, 224), and device platforms (e.g. 132) from each other, in order to (a) minimize impact of changes or variations in one system from the others; (b) minimize testing effort and technical risk on a case-by-case basis when implementing across different device platforms and products; and (c) make applications developed for a given application environment more portable across various network systems and devices.

The connection management function of the service and network interface 140 monitors various network connections and bearers such as 3G, W-LAN, 1×RTT, takes actions based on the previously set policies, and notifies applications and application engines about changes in connection, with relevant details. This is very useful for applications such as Video Share, which requires 3G mobile network support. When a 3G network becomes unavailable and the connection reverts to a 2.5G network, for example, the video share should be disabled. The Video Share applications benefit from having the connection management function of the service and network interface 140 fulfill this requirement without having to monitor and manage the connection status.

The QoS manager function of the SAC 100 operates as follows. Many networks support quality of service for various types of data transfers. Depending upon the priority of application, it may be desirable to set a high priority for data transfers. These settings are typically done at the platform level and not easily accessible to application layers. The QoS manager function facilitates this feature for the applications.

The session management function of the SAC 100 is responsible for establishing and monitoring sessions such as opening TCP/IP ports and monitoring their status. When there is data or there is a break in the session, the session management function either takes action based on the policies set, or informs the relevant applications and application engines about the event and provides the relevant details.

Network bearer management is handled by the SAC 100, which provides independence from the details of network bearer management for applications and other integrated elements such as application engines. The various connection procedures needed to use a bearer is handled within the SAC 100. The platform interface 130 is used to call specific platform API's to create and manage connections using the bearer of choice based on dependencies and requirements specified by the requesting element. This enables the application engines and applications to specify the connection requirements, while the SAC 100 manages the complex tasks related to bearer and connection management.

Network protocols are handled by the SAC 100 through the platform interface 130. The SAC 100 interacts with service provider infrastructures 142 using any protocols such as UDP and HTTP over IP. The platform interface 130 is used to invoke specific platform API's to send and/or receive IP packets in the protocol of choice.

Protocols are managed through the enablers 124. Specifically, the SAC 100 utilizes the stateless enablers 124 integrated through the extension interface 120 to send and/or receive application level protocols such as SIP, SDP, and MSRP. This allows applications and application engines to use these functions without the complex tasks of performing low level detailed protocols and provides for modular technology and standards upgrades without requiring changes to the applications themselves.

The Extension Interface 120

The extension interface 120 supports modular and flexible application engine and technology and standards enabler library integration. The SAC 100 (a) adapts API sets and conventions from various module suppliers and API conventions through a common integration and abstraction layer, the extension interface 120; (b) allows for exchange of engines and libraries independent of applications (application API's remain unchanged) for upgrades and special cases; and (c) supports state data sharing between engines through a common and controlled interface.

The SAC architecture allows third party technology providers to integrate application engines 122 and enablers 124 into the SAC 100 through the extension interface 120, so that features implemented by the application engines 122 and enablers 124 can be accessed through the SAC 100 via the application Interface 110. The extension interface 120 provides for a modular architecture, and flexible integration of the application engines 122 and the enablers 124. The extension interface 120 provides a layer of abstraction for the functions and features implemented in the application engines 122 and in the stateless enablers 124. This allows common applications and application logic controllers (ALC's) to be built that can work with multiple application engines 122 and enablers 124. The extension interface 120 allows the application engines 122 and the enablers 124 to share the state maintained in the SAC 100. This methodology provides a means to control access and manage policy centrally for all engines, enablers, and applications. This also enables the engines 122 and the enablers 124 to be changed or upgraded without changing the API's used to access them, and independent of the applications that use them.

Two categories of application engines may be envisioned: general purpose and application specific. The general purpose engines are typically used by many applications and application logic controllers, or when the system boots up. An example is a Session Initiation Protocol ("SIP") User Agent (see, e.g., 431 in FIG. 4) that is used by many SIP applications such as Voice Over IP and Instant Messaging. An IMS Startup Engine (see, e.g., 435 in FIG. 4) is another example of a general purpose engine. The application-specific engines perform the logic and manage the state (illustratively for use in situation awareness such as Presence, Location, and Identity) and data management needed to perform the application function. For example, an Instant Messaging Engine may perform page mode and session mode operations for a specific IM protocol along with managing the necessary states needed to support them. Other examples include digital identity management, digital wallet management, rights management, situation management, contact and group list management, video share, VoIP and PoC. Managing user and application data, maintaining state transitions, providing data packing and management are typical functions of an engine.

Enablers 124 are generally "stateless," that is they perform functions that do not require state information to be kept, and usually operate on a "request-response" model. Enablers 124 generally implement protocols defined by industry standards or specific technologies. Examples of industry standard enablers include modules that perform protocols such as SIP, HTTP, RTP, RTCP, SigComp, IMS Library functions, XDM, MSRP, presence, and device management. Examples of enablers based on proprietary specifications include functions and protocols like location, digital identity, digital rights, and security protocols.

The application engines 122 and the enablers 124 may have "dual" API access, in that they may be integrated to and accessed through SAC using API's in the application interface 110, and they may also be accessible directly from an application 206, 216, 226, or from other application engines 122 in cases where direct access is desired and the functions of the SAC 100 are not necessary.

In some cases, engine and enabler stacks may be layered to provide a common set of functions and API's that support multiple methods. The method to be used is determined by a rule set or provision-able policy. An example is the SIP stack described below with reference to FIG. 4. There are multiple SIP methods that may be required based on the network and/or service infrastructure requirements. These may vary depending on the application and service infrastructure element used.

Implementation Example 1

Real Time Communication System

Figure 4:
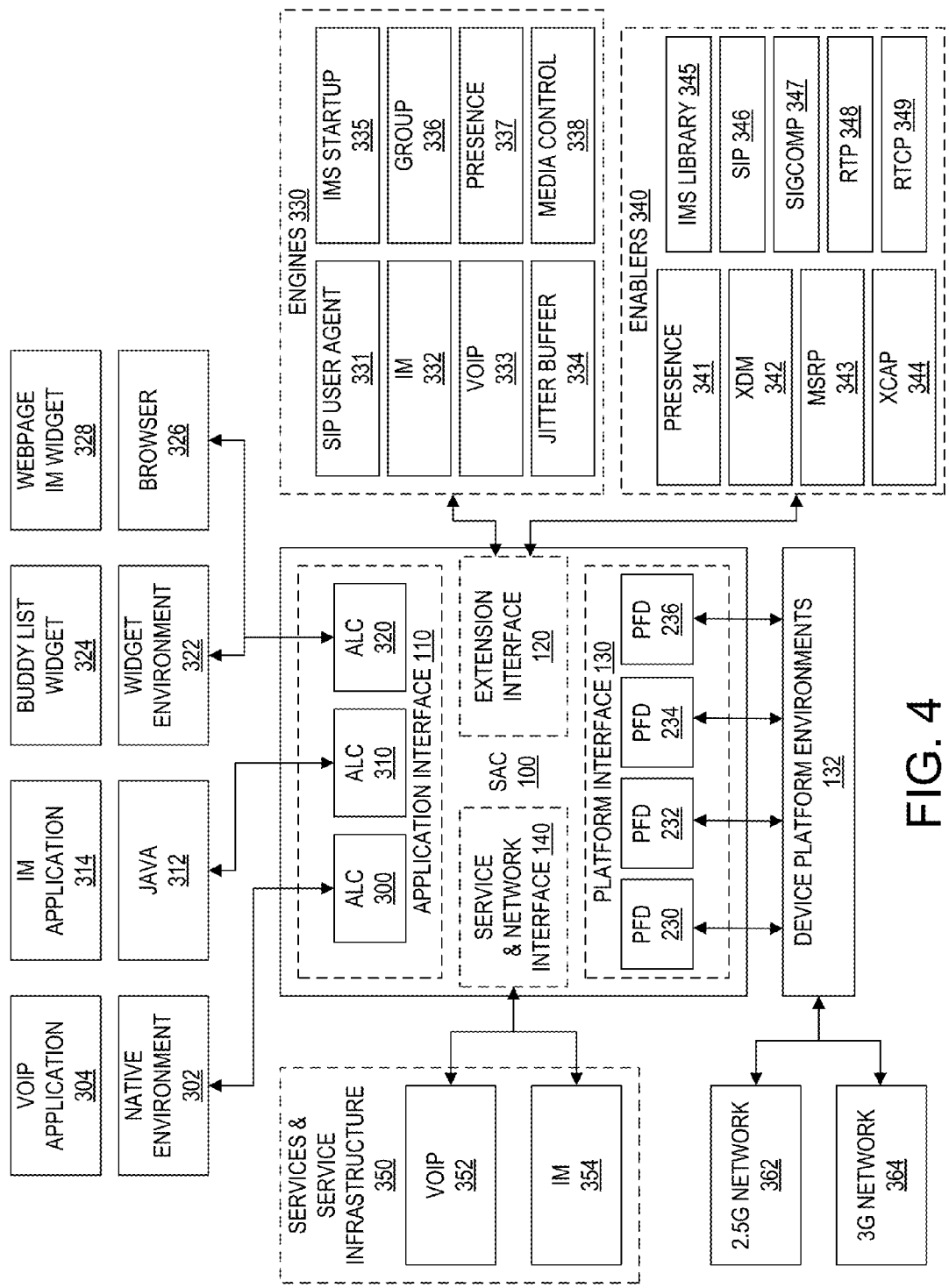
FIG. 4 is a schematic block diagram of an illustrative implementation of a services and applications controller, communications software, and service solutions using the Session Initiation Protocol and the Internet Protocol Multimedia Subsystem technology and standards.

FIG. 4 is a schematic block diagram of an illustrative Internet Protocol Multimedia Subsystem ("IMS") client architecture for handling multiple IMS applications, with particular emphasis on the application engines and enablers. The architecture is based on the general architecture shown in FIG. 2, in which the SAC 100 interacts with a platform environment, an applications environment, a network environment, and a shared engine/enabler environment. The SAC 100 abstracts these environments and includes a common set of functions, which enable interactions between these environments without requiring that any of the environments be aware of specific aspects of the other environments for the interactions.

Illustrative networks shown in FIG. 4 are 2.5G cellular network 362 and 3G cellular network 364. Illustrative services and service infrastructure 450 are a Voice over IP ("VoIP") application server 352 and an instant messaging ("IM") application server 354 implement VoIP and IM services.

Illustrative applications and application environments shown in FIG. 4 are as follows. A VoIP application 304 is implemented in the native environment 302. This application implements user interfaces such as screens, dialogs, icons, and input from the user. This application includes screen transitions when various VoIP features such as calling a contact, receiving a call from a contact, forward a call etc, are provided to the user. An IM application 314 is implemented in the Java environment 312. This application includes screen transitions, dialogs, icons and input from the user to support IM features such as send an instant message or receive and display a message. Typical communication systems include a buddy list application. In this illustrative implementation, the buddy list is implemented as buddy list widget 324 in the widget environment 322. Buddy list widget 324 supports such buddy list management features as add a buddy, delete a buddy, get a list of buddies and their contact information. Optionally, the IM functions can be implemented as a widget, such as a webpage IM widget 328 in browser environment 326.

Various engines 330 and enablers 340 are used to realize the real time communication system of FIG. 4. IMS startup engine 435 is responsible for creating the initial registration with the network in an IMS-based real time communication system. IMS startup engine 435 also handles authentication and retires needed to complete and maintain a valid registration of the device with the network. SIP User Agent 331 keeps track of state-full SIP sessions including SIP dialogs and transactions, as mentioned in IETF RFC 3261 and profiles recommended in 3GPP and 3GPP2 technical specifications. Group engine 336 provides functions necessary to create and maintain group lists on the network. Presence engine 337 provides functions for publishing users presence such as Online/Offline, Available/Busy/Away, Location information to the network. IM engine 332 is responsible for providing functions such as creating an IM session, and managing these IM sessions with single contact or a group of contacts. VoIP engine 333 implements functions such as creating a VoIP session, and managing the session including terminating the session. Jitter buffer engine 334 includes a jitter buffer necessary to create a smooth playback of media in real time communication. In this embodiment, the jitter buffer engine 334 queues audio packets in the right sequence, and plays them through the device audio system when there are enough packets in the jitter buffer. The configuration parameters within jitter buffer engine 334 can be configured using the extension interface. Media control engine 338 is responsible for media codec negotiations during a SIP session using SDP parameters defined in IETF RFC 3261 and 3GPP and 3GPP2 technical specifications.

The real time communication system shown in FIG. 4 also uses a set of enablers to create and parse communication messages according to standards such as IETF, OMA, 3GPP and 3GPP2. An illustrative set of enablers includes SIP 346, SigComp 347, RTP 348, RTCP 349, IMS library 345, MSRP 343, XDM 342, XCAP 344, and presence 341. The Session Initiation Protocol ("SIP") is emerging as the de-facto signaling protocol for real time communication system. The SIP enabler 346 is responsible for constructing and parsing of messages encoded in SIP format. The SigComp (Signal Compression) enabler 347 facilitates compressing SIP messages so that the available bandwidth on the network is utilized effectively. The Real-time Transfer Protocol ("RTP") is a standard protocol used to encode media packets such as audio and video while sending them over an IP network. The RTP enabler 348 provides the functions to construct and parse RTP messages. The RTP Control Protocol ("RTCP") provides control over RTP messages, such as when an RTP packet is sent or received. This protocol is useful in calculating jitter in the network and smoothen the flow of media and playback. The RTCP enabler 349 functions are used to construct and parse RTCP messages. The IMS Library 345 provides an abstraction over the SIP enabler 346, the SigComp enabler 347, the RTP enabler 348, and the RTCP enabler 349 so that IMS specific variations in these protocols are supported. The Message Session Relay Protocol ("MSRP") is a standard protocol to create media sessions and transmit any content over a TCP channel. The MSRP enabler 343 facilitates construction and parsing of MSRP packets. The XDM (XML based Data Model) enabler 342 helps in creating various lists such as buddy list, watcher list, black list using XML data, and parsing them. The XML Configuration Access Protocol ("XCAP") allows a client to read, write and modify application configuration data stored in XML format on a server. The XCAP enabler 344 helps construction and parsing of XCAP messages. The presence enabler 341 is responsible for constructing and parsing SIP as well as XDM messages carrying presence or presence-related lists such as subscription lists.

The various components of the real time communication system of FIG. 4 interact in the following manner. The SAC 100 is configured to load the IMS startup engine 335, the SIP user agent engine 331, the jitter buffer engine 334, and the media control engine 338, and all of the enablers 340. When the SAC 100 starts up as a service on an operating system such as Symbian or Windows, it loads these engines and enablers. The IMS startup engine 335 requests the SAC 100 to create the necessary channels needed to communicate with a network, and uses these channels to register the device with a network such as an IMS network. When the user invokes the VoIP application 304, it deploys with the SAC 100 and requests the VoIP engine 333 to be loaded. The SAC 100 loads the VoIP engine 333 and notifies the VoIP application 304 that the VoIP engine 333 is ready for use. When the user then tries to call a contact using VoIP, the VoIP application 304 calls the API for the VoIP engine 333 to setup a VoIP session between the user and the contact. The VoIP engine 333 uses the SIP user agent engine 331 and the IMS library enabler 345 and the SIP enabler 346 along with the SAC 100 to create a session with the VoIP server 352 on the network. During the VoIP session, the VoIP engine 333 requests the media control engine 338 to negotiate an appropriate audio codec for media transfer. After the VoIP session is established, the user may talk using the microphone. The VoIP engine 333 captures the audio data, and sends it to the contact using the SAC 100 and an appropriate one of the platform drivers. On the recipient side, audio packets are received by a suitable one of the platform drivers, and handed over to the VoIP engine 333 for processing. The VoIP engine 333 using the RTP enabler 348 deciphers the audio data and passes them to the jitter buffer engine 334 for queuing and playback. The jitter buffer engine 334 stitches the audio packets according to the correct time sequence, and plays on the audio using a suitable one of the platform drivers. When the user wants to send an IM message, the VoIP application 304 lets the SAC 100 know that it needs to invoke the IM application 314. Using the server module 248 and the signaling module 254 (FIG. 3), the SAC 100 invokes the IM application 314. The IM application 314 requests the SAC 100 to load the IM engine 332. The SAC 100 loads the IM engine 332 and informs the IM application 314 that the IM engine 332 is ready for use. The IM application 314 may then accept the data that needs to be sent over IM, and through the SAC 100 invokes the IM engine 332 and hands over the data. The IM engine 332 uses the SAC 100 to send the data over to the network.

Implementation Example 2

Adding New Application Categories

Figure 5:
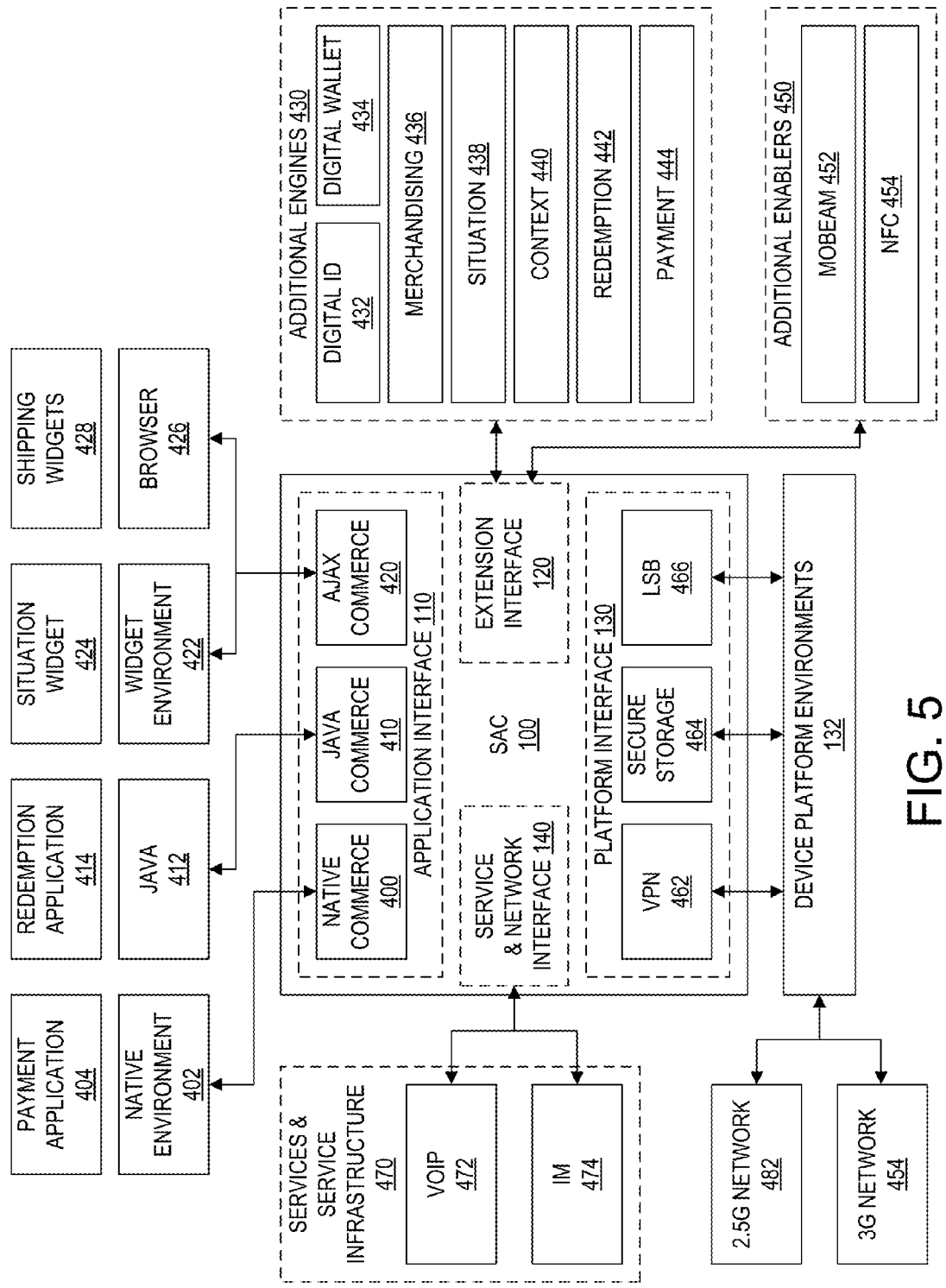
FIG. 5 is a schematic block diagram of an illustrative implementation of a services and applications controller, communications software, and service solutions for electronic commerce.

FIG. 5 is a schematic block diagram of additional extensions, ALC's and PFD's that may be added to the implementation of Example 1 to add new application categories. The category of mobile commerce is added in this Example.

Additional engines 430 added through the extension interface 120 include a digital Identity engine 432 which manages the user's application and service identities and credentials; a digital wallet engine 434 which manages the user's information such as banking accounts, credit cards, payment credits, financial and points information, loyalty and membership information; a merchandising manager engine 436 which handles merchandising items such as advertisements, promotions such as coupons and special offers, and recommendations; a situation engine 438 which provides situation awareness information such as location, availability, local connection and service availability; a context engine which provides preference, history, and use profiling functions and information for authorized applications, services, and engines; a redemption engine 442 which manages, delivers, tracks, and reports redemptions of items such as coupons, rebates, and membership points at point of sale; and a payment engine 444 which handles payments at points-of-sale. Additional enablers 450 added through the extension interface 120 include a Mobeam enabler 452 which supports the beaming of barcode data to barcode readers, and a Near-Field-Communication ("NFC") enabler 454 which supports NFC transmission to NFC transceivers. The MoBeam® technology is available from Ecrio Inc. of Cupertino, Calif., and is described along with a variety of personal digital electronic devices in a number of patents and patent applications, including U.S. Pat. No. 6,685,093 issued Feb. 3, 2004 to Challa et al.; U.S. Pat. No. 6,877,665 issued Apr. 12, 2005 to Challa et al.; U.S. Pat. No. 7,028,906 issued Apr. 18, 2006 to Challa et al.; U.S. Pat. No. 7,395,961 issued Jul. 8, 2008 to Challa et al.; and US Patent Application Publication No. US 2008/0035734, published Feb. 14, 2008 in the name of Challa et al., all of which hereby are incorporated herein in their entirety by reference thereto.

Additional ALC's are added to provide the additional commerce functions to the various application environments. Native commerce ALC 400 translates the additional API's provided through the SAC 100 from engines, enablers, device platforms, and services into the conventions used by the native environment 402. It also supports the signaling, state sharing, and data sharing functions. JAVA commerce ALC 410 includes the native ALC functions, and also includes integration to the Java Virtual Machine through the Java VM native interface if present, or through bindings to the VM environment. It also includes additional application capabilities and logic not easily supported by the Java programming environment, such as background processing for real-time event handling and a higher level set of API's to minimize the programming required by the Java application. AJAX commerce ALC 420 includes the functions provided by the JAVA Commerce ALC, bindings to the AJAX environment and widget runtime and browser, and additional application logic to minimize the number and complexity of API's required to perform commerce functions.

Three additional platform drivers are added to either the existing PFD's or as separate modules. VPN PFD function 462 integrates a specialized secure transport function installed in the platform. Secure storage PFD function 464 integrates the platform secure storage resource to the SAC 100. LBS PFD function 466 integrates with the platform's location functions and information.

The registration of each module includes a policy and security document to define the access control and security requirements. The policy provisioning is performed using an XML document that follows a defined data structure. The policy includes privacy and security preferences and rules set by the user, service provider, platform, and engine. Secure certificates are installed to control access to the defined API's, state data, and shared data. To gain access to the function or data, the requesting element supplies the appropriate key through a secure channel.

The campaign service sends profile and promotion items to the merchandising engine 436 such as advertisements, coupons, and offers. This is done through a provisioning process using XML based documents delivered through an OMA Device Management provisioning event and the document being parsed by the merchandising engine 436 which is registered with the OMA-DM application on the device as the handler for the merchandising document type. The merchandising engine 436 stores the items in the shared database including relevant profile and meta-data to describe the target situation for placement and use.

The situation engine 438 defines and stores situation data such as location available to authorized requesting elements.

A shopping application (not shown) or an advertising paid game application (not shown) may perform a discovery function to find the relevant merchandising data, supply credentials to authorize access as required, and select promotions based on situation data provided by the other applications, collect responses from the user, and contribute meta-data or other response information and, in return, receives credits or points from the provider. The various applications or functions can be in different environments. For example, the merchandising application may be in the Java environment, the situation manager may be a native C application or application engine (438), the game may be in the Flash or AJAX widgets runtime environment, and the shopping application may be performed through an AJAX browser using widgets embedded in web pages.

Situation widget 424 can be invoked and notified that the current location and context state matches predetermined criteria. An offer and recommendation widget (not shown) may then be invoked, and collects recommendation and offer information provisioned by a local service based on information from supplied by the context engine. At point-of-sale, the Java redemption application 414 may be used to retrieve the coupon and rebate data from the digital wallet, and invoke the redemption engine to beam the coupon and rebate data to a barcode scanner using the MoBeam enabler 452. The redemption engine 442 confirms the transaction, and generates a message to the Redemption Service. The redemption application 414 then invokes the payment application 404. The payment application 404 is used to confirm the user ID with the Identity engine, select the payment method, check balances through the banking service, and invoke the payment engine which retrieves the payment credential information from the digital wallet engine 434, and then uses the NFC enabler 454 to transfer the payment credentials to a NFC transceiver. The payment confirmation and transaction history is updated and the use profile is updated by the context engine 440.

While the systems and methods described herein are useful for many different types of digital electronic devices, the second implementation example is particularly useful for personal digital electronic devices, particularly those that are wireless-communications enabled and mobile. "Personal digital electronic devices" are digital electronic devices that can be personalized for the user. They may be easily carried on the person, and include such devices as mobile phones, personal digital assistants ("FDA"), gaming devices, audio and video players, fobs, and USB Flash drives. They may be intended for use at a fixed location in a home, office or vehicle, and include such devices as external hard drives and on-demand cable boxes. Personal digital electronic devices are suitable for many uses, including communications, entertainment, security, commerce, guidance, data storage and transfer, and so forth, and may be dedicated to a particular use or may be suitable for a combination of uses. Personal digital electronic devices have various capabilities that may be used to present digital transaction documents and secured digital transaction documents at transaction facilities, including speakers, screens, wired personal area networks such as USB and FireWire, wireless personal area networks such as IrDA, Bluetooth, UWB, Z-Wave and ZigBee, and the MoBeam technology.

The systems and methods described herein may be realized in software, or in hardware such as an ASIC or chip set, or in a combination of software and hardware. When implementation is done using hardware, it includes a processor and memory. The core functions of the SAC are implemented in the ASIC, and the memory is used to store state, data and other information required for functioning of the SAC. The functions, interfaces and intercommunication among various modules described in the embodiments remains the same for the hardware based implementation as well. The algorithms, logic and processing done in ALC and PFD modules are implemented in the ASIC, and expose the interfaces to external components. The extension module within the SAC ASIC loads the executable(s) for the extensions into memory and executes them whenever needed.

Figure 6:
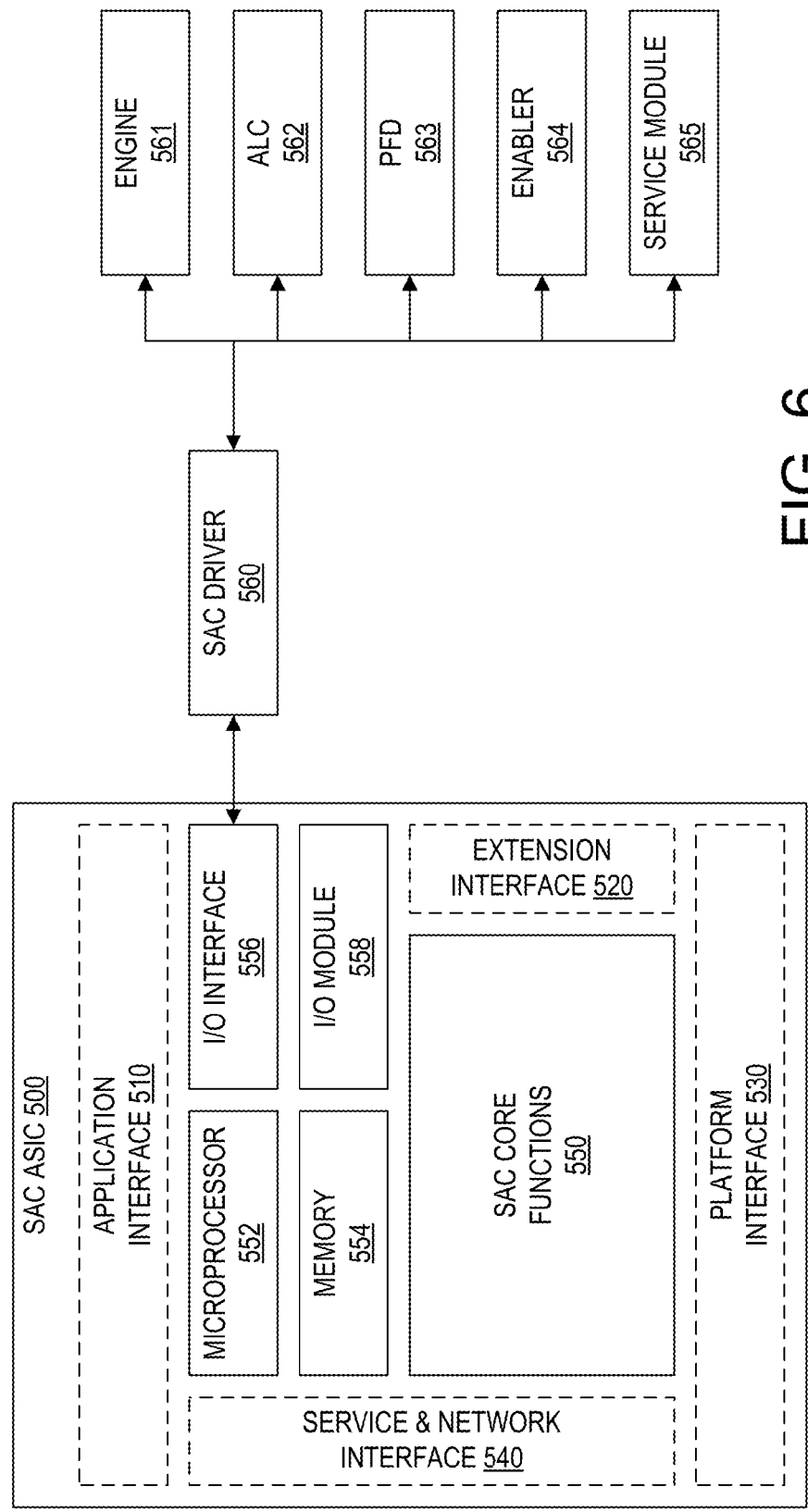
FIG. 6 is a schematic block diagram of an illustrative ASIC implementation.

FIG. 6 shows an illustrative SAC ASIC implementation 500. The SAC core functions 530, application interface 510, extension interface 520, platform interface 530, service and network interface 540, microprocessor 552, memory 554, I/O interface 556, and I/O module 558 are implement on the ASIC chip. The various components that interact with the SAC ASIC 500 using the application interface 510, the extension interface 520, the platform interface 530, and the service and network interface 540 are based on software to facilitate changes and adaptation to specific platforms and application requirements. Specifically, engine 561, ALC's 562, PFD's 563, enablers 564, and service interface modules 565 are software modules that interrelate with the SAC ASIC 500 over an interface using a driver. For example, as depicted in FIG. 6, in one illustrative implementation the software elements interrelate to the SAC ASIC 500 through SAC driver 560, which controls a high-speed serial Input/Output channel with appropriate signaling channels. I/O module 558 manages the Inter-Process Communication to the appropriate interface and to the SAC core functions 550. The SAC driver 560 provides API's to the ALC's 562, PFD's 563, engines 561, enablers 564, and service modules 565 based on the interface type. The SAC Driver 560 supports the API's and performs the translation and coding needed to convert them to the serial data format and protocol used by the SAC ASIC 500. Likewise, the SAC Driver 560 converts the information from the SAC ASIC 500 into an appropriate interface format, and performs the API support needed by the ALC's 562, PFD's 563, engines 561, enablers 564, and service modules 565. In this illustrative implementation, the components that interact with the SAC ASIC 500 use the same API's and methodology when interrelating with the SAC Driver 560 as they do when interacting directly with a software implementation of the SAC. The service module 565 is used by the service and network interface as an adapter to interoperate with various network, service infrastructure, and service application systems.

The I/O Interface 556 and the driver methodology can be varied to support other requirements. For example, in more demanding and complex implementations, the I/O interface 556 can be implemented as multiplexed channels or a Bus interface. Separate drivers can be implemented for each interface type.

The techniques described herein may be combined in various ways. In one illustrative implementation, the SAC is integrated to a device platform through the device interface, and a network-based service is included through the service and network Interface. The SAC is used to provide an on-device service that allows service applications to discover and access or deliver data, signaling, messaging, or situation information to or from unknown device functions. Similarly, device platform functions may discover and access information provided by unknown service functions. In this case, the service application and the device function are not required to use a common method or even be aware of the origin of the information. For example, a location based service function in the device may register and store location data in the SAC. The service can make an inquiry of SAC for location data and retrieve the data descriptor and the location data from SAC. The service may set a service policy in SAC for use of the network and the various device platform retrieve the policy information and perform the operations determined by the policy. This implementation does not make use of an application engine, enablers, or applications.

In another illustrative embodiment, a device is used for monitoring and communication with a service through a connection such as a security or telemetry device. A SAC is implemented in the device with the service and network interface used to support the network connection and service, the platform interface is used to integrate with the device, and the extension interface is used to integrate with an enabler and engine that is used to implement a proprietary and secure transport protocol and monitor data from a specialized device. In this case, no application integration is required since the application is performed on the service. This method allows the service engine and enabler configuration to be used in multiple devices from multiple sources without the device being aware of the particular methods and security used, while still using the device platform resources. Alternatively, this method can be used to support multiple services with proprietary protocols and methods from a single device platform.

Further technical information that may be useful as background or for implementing various aspects of the architecture and methods described herein are described in the following documents, which are available from Ecrio Inc. of Cupertino, Calif., and are incorporated herein in their entirety by reference thereto: (A) Ecrio Inc., Ecrio SAC Product Specification Document; (B) Ecrio Inc., Ecrio SAC Architecture and Design Document; and (C) Ecrio Inc., Ecrio SAC Application Programming Interface Specification Document.

The various embodiments of the invention described herein are illustrative of our invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention, as set forth in the following claims.

The invention claimed is:

1. A communications-enabled digital electronic device comprising a processor and associated non-transient memory and having a controller comprising:
   a platform interface comprising a plurality of platform application program interfaces ("API's") for interfacing with a plurality of device platform environments, the platform interface providing a layer of abstraction for the device platform environments through the platform API's;
   a service and network interface comprising a plurality of service API's for interfacing with a plurality of services, service infrastructures, and networks, the service and network interface providing a layer of abstraction for the services, service infrastructures, and networks through the service API's;
   an extension interface comprising a plurality of extension API's for interfacing with a plurality of application engines and enablers, the extension interface providing a layer of abstraction for the application engines and enablers through the extension API's;
   an application interface comprising a plurality of application API's for interfacing with a plurality of applications and application environments, the application interface providing a layer of abstraction for the applications and application environments through the application API's, and comprising a plurality of application logic controllers ("ALC's") for translating between the application API's, the platform API's, the service API's, and the extension API's; and
   a set of core modules comprising a communication module adapted to provide for sharing of communications information comprising session data, service data, network data, or quality of service data through the platform interface, the application interface, the extension interface, and the service and network interface; an application module adapted to provide for sharing of application information comprising deployment and un-deployment data or conflict resolution data through the platform interface, the application interface, the extension interface, and the service and network interface; a state module adapted to provide for sharing of state information through the platform interface, the application interface, the extension interface, and the service and network interface; and a data management module adapted to provide for sharing of data through the platform interface, the application interface, the extension interface, and the service and network interface, and for storage of the state information shared by the state module.

2. The digital electronic device of claim 1 wherein:
   at least one of the ALC's is for a native application environment, at least one of the ALC's is for a procedural runtime environment, and at least one of the ALC's is for a declarative runtime environment;
   the ALC for the procedural runtime environment comprises application logic to perform functions for runtime applications that are not supported or easily performed in the runtime environment; and
   the ALC for the declarative runtime environment comprises application logic to perform common functions.

3. The digital electronic device of claim 1 wherein at least one of the ALC's is for performing application logic to further abstract the applications.

* * * * *